United States Patent
Zhang et al.

(10) Patent No.: US 9,811,746 B2
(45) Date of Patent: Nov. 7, 2017

(54) METHOD AND SYSTEM FOR DETECTING TRAFFIC LIGHTS

(71) Applicant: Harman International Industries, Incorporated, Stamford, CT (US)

(72) Inventors: Yankun Zhang, Shanghai (CN); Chuyang Hong, Shanghai (CN); Ruyi Jiang, Shanghai (CN); Yun Zhou, Shanghai (CN); Norman Weyrich, Shanghai (CN)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 14/646,337

(22) PCT Filed: Nov. 20, 2012

(86) PCT No.: PCT/CN2012/084862
§ 371 (c)(1),
(2) Date: May 20, 2015

(87) PCT Pub. No.: WO2014/078979
PCT Pub. Date: May 30, 2014

(65) Prior Publication Data
US 2015/0294167 A1    Oct. 15, 2015

(51) Int. Cl.
*G06K 9/00* (2006.01)
*G06T 1/00* (2006.01)
*G06K 9/46* (2006.01)

(52) U.S. Cl.
CPC ....... *G06K 9/00825* (2013.01); *G06K 9/4652* (2013.01); *G06T 1/0007* (2013.01);
(Continued)

(58) Field of Classification Search
CPC .......................................... G06T 2207/10004
See application file for complete search history.

(56) References Cited

U.S. PATENT DOCUMENTS

| 4,351,004 A * | 9/1982 | Choate ............... G06K 7/10851 348/E3.022 |
| 2002/0080998 A1* | 6/2002 | Matsukawa ........ G06K 9/00818 382/103 |

(Continued)

FOREIGN PATENT DOCUMENTS

| CN | 101382997 A | 3/2009 |
| CN | 101404117 A | 4/2009 |

(Continued)

OTHER PUBLICATIONS

Xu, C. et al., "Traffic Lights Recognition Algorithm Based on Lab Color Space and Template Match," Journal of Computer Applications, vol. 30, No. 5, May 2010, 4 pages. (See NPL 2, International Search Report Issued in Patent Application No. PCT/CN2012/084862 for additional explanation of relevance).

(Continued)

*Primary Examiner* — Oneal R Mistry
(74) *Attorney, Agent, or Firm* — McCoy Russell LLP

(57) ABSTRACT

A method for detecting traffic lights is provided. The method includes: obtaining a color image captured by a camera; converting the color image into a first monochrome scale image; converting the first monochrome scale image into a first binary image; identifying a first set of candidate blobs in the first binary image based on at least one predetermined geometric parameter; and determine whether a first region in the color image, which first region corresponds to one of the first set of candidate blobs, is a green traffic light using a green traffic light classifier. The accuracy and efficiency may be improved.

21 Claims, 9 Drawing Sheets

(52) U.S. Cl.
CPC ............... *G06T 2207/10004* (2013.01); *G06T 2207/10024* (2013.01); *G06T 2207/30252* (2013.01)

(56) References Cited

U.S. PATENT DOCUMENTS

| | | | | |
|---|---|---|---|---|
| 2006/0245618 | A1* | 11/2006 | Boregowda | G06T 7/2006 382/107 |
| 2007/0189615 | A1* | 8/2007 | Liu | G06K 9/38 382/232 |
| 2009/0010494 | A1* | 1/2009 | Bechtel | B60Q 1/1423 382/104 |
| 2010/0014707 | A1* | 1/2010 | Nakamori | G06K 9/4652 382/103 |
| 2013/0100286 | A1* | 4/2013 | Lao | G06K 9/00785 348/148 |

FOREIGN PATENT DOCUMENTS

| | | |
|---|---|---|
| CN | 102354457 A | 2/2012 |
| JP | 2007257300 A | 10/2007 |
| JP | 2009043068 A | 2/2009 |

OTHER PUBLICATIONS

ISA State Intellectual Property Office of the People's Republic of China, International Search Report Issued in Patent Application No. PCT/CN2012/084862, dated Aug. 1, 2013, WIPO, 4 pages.

De Charette, R. et al., "Real Time Visual Traffic Lights Recognition Based on Spot Light Detection and Adaptive Traffic Lights Templates," Proceedings of the 2009 IEEE Intelligent Vehicles Symposium, Jun. 3, 2009, Xi'an, China, 6 pages.

Yu, C. et al., "Traffic Light Detection During Day and Night Conditions by a Camera," Proceedings of the 2010 IEEE 10th International Conference on Signal Processing (ICSP), Oct. 24, 2010, Beijing, China, 4 pages.

Saa-Garriga, A., "Traffic Lights Detection in Images for Intelligent Vehicles," Master in Computer Vision and Artificial Intelligence—Report of the Master Project—Option: Computer Vision, Universitat Autonoma de Barcelona, Available Online at www.researchgate.net/publication/272088763_Master_Thesis_Traffic_Lights_Detection_in_Images_for_Intelligent_Vehicles, Oct. 2012, 36 pages.

European Patent Office, Extended European Search Report Issued in Application No. 12888632.2, dated Aug. 11, 2016, Germany, 7 pages.

* cited by examiner

METHOD AND SYSTEM FOR DETECTING TRAFFIC LIGHTS

CROSS REFERENCE TO RELATED APPLICATION

The present application is a U.S. National Phase of International Patent Application Serial No. PCT/CN2012/084862 entitled "METHOD AND SYSTEM FOR DETECTING TRAFFIC LIGHTS" and filed on Nov. 20, 2012, the entire contents of which are hereby incorporated by reference for all purposes.

TECHNICAL FIELD

The present disclosure generally relates to a method and a system for detecting traffic lights.

BACKGROUND

Traffic light detection may assist a vehicle mounted navigation system to improve its accuracy. In an existing method, traffic lights are detected based on color. In such a method, a color image is captured by a vehicle mounted camera. Then candidate regions may be identified by color segmentation and blob analysis. Thereafter, the candidate regions in the color image are respectively compared with a red traffic light model and/or a green traffic light model to determine whether there is a traffic light in the color image. However, green traffic light detection based on color is not so reliable because the color of a green traffic light in an image captured by a camera can be affected by other factors easily, such as ambient light etc. Therefore, a robust method for detecting traffic lights is desired. A robust method for detecting red traffic light is also needed.

SUMMARY

According to one embodiment of the present disclosure, a method for detecting traffic lights is provided. The method includes: obtaining a color image captured by a camera; converting the color image into a first monochrome scale image; converting the first monochrome scale image into a first binary image; identifying a first set of candidate blobs in the first binary image based on at least one predetermined geometric parameter; and determining whether a first region in the color image, which first region corresponds to one of the first set of candidate blobs, represents a green traffic light using a green traffic light classifier.

In some embodiments, the first monochrome scale image may be a gray scale image. In some embodiments, the color image may be converted into the gray scale image based on brightness value. In some embodiments, the color image may be converted into the gray scale image based on green channel value.

In some embodiments, the first monochrome scale image may be a green scale image. In some embodiments, the color image may be converted into the green scale image by removing red channel and blue channel information.

In some embodiments, a lower part of the color image may be removed and the rest upper part of the color image may be converted into the monochrome scale image.

In some embodiments, the method may further include applying a white top-hat morphology operator on the first monochrome scale image to obtain a second monochrome scale image, and converting the second monochrome scale image into the first binary image.

In some embodiments, the first binary image may be converted from the first or second monochrome scale image using an OSTU method.

In some embodiments, the first binary image may be converted from the first or second monochrome scale image based on a first threshold of brightness. In some embodiments, the first threshold of brightness may be from about 70% to about 80% of a mean brightness of the first or second monochrome scale image. In some embodiments, the first threshold of brightness may be 75% of the mean brightness. As a result, if the brightness of a pixel in the first or second monochrome scale image is greater than the first threshold of brightness, the pixel will be set as valid, otherwise, the pixel will be set as invalid. A valid pixel means that the pixel will be considered when identifying the first set of candidate blobs.

In some embodiments, in the first binary image, a valid pixel may be in white, and an invalid pixel may be in black. In some embodiments, in the first binary image, a valid pixel may be in black, and an invalid pixel may be in white.

In some embodiments, the at least one geometric parameter may include a size parameter. In some embodiments, the at least one geometric parameter may include a shape parameter.

In some embodiments, the size parameter may be a range of pixel number. In some embodiments, the range of pixel number may be from about 5 pixels to 300 pixels. In other words, blobs having more than about 300 pixels or less than about 5 pixels may be filtered out. The range of pixel number may be determined based on parameters of the camera such as resolution and focal length etc. As a result, too large or too small blobs, which are not likely to be a traffic light, may be filtered out. In addition, a traffic light being too close or too far from the camera may also be filtered out, since it may not be helpful to navigation accuracy.

In some embodiments, the size parameter may be a width range. In some embodiments, the width range may be from about 5 pixels to about 25 pixels. In other words, blobs having a minimum enclosing rectangle with a width greater than about 25 pixels or less than 5 pixels may be filtered out. The width range may also be determined based on parameters of the camera such as resolution and focal length. As a result, a traffic light being too close or too far from the camera may be filter out. In some embodiments, the at least one geometric parameter may include both the range of pixel number and the width range.

In some embodiments, the shape parameter may be a range of width to height ratio. In some embodiments, the range of width to height ratio may be from about 0.8 to about 1.25. In other words, blobs having a minimum enclosing rectangle with an aspect ratio greater than about 1.25 or less than about 0.8 may be filtered out. As a result, blobs which are not likely to be round may be filtered out.

In some embodiments, the green traffic light classifier may be suitable for monochrome scale image, and it may be applied on the first monochrome scale image to determine whether the first region in the color image represents a green traffic light. In some embodiments, the red traffic classifier may be suitable for color image, and it may be applied on the color image to determine whether the first region in the color image is a green traffic light.

In some embodiments, the green traffic light classifier may be template matching, neural network, support vector machine (SVM) or cascade detector.

According to one embodiment of the present disclosure, the method for detecting traffic lights may further include: converting the color image into a second binary image;

identifying a second set of candidate blobs in the second binary image based on the at least one predetermined geometric parameter; and determining whether a second region in the color image, which second region corresponds to one of the second set of candidate blobs, represents a red traffic light using a red traffic light classifier, where the color image may be converted into the second binary image based on equation (1):

$$Q=2R-G-B \quad \text{Equation (1)}$$

where R, G, and B respectively represent red channel value, green channel value, and blue channel value of a pixel, if the Q value of the pixel is greater than a second threshold value, the pixel will be set as valid, if the Q value of the pixel is smaller than the second threshold value, the pixel will be set as invalid.

In some embodiments, the red traffic classifier may be suitable for monochrome image, and may be applied on the first monochrome scale image to determine whether the second region in the color image represents a red traffic light. In some embodiments, the red traffic classifier may be suitable for color image, and may be applied on the color image to determine whether the second region in the color image is a red traffic light.

In some embodiments, the second threshold value may be in the range from about 210 to about 230. In some embodiments, the second threshold value may be 220. The second threshold value may be determined based on parameters of the camera such as color gamut and color saturation etc. As a result, pixels in which the red color prevails are set as valid.

According to one embodiment of the present disclosure, a method for detecting green traffic lights is provided. The method includes: obtaining a color image captured by a camera; converting the color image into a first monochrome scale image; converting the first monochrome scale image into a first binary image; identifying a first set of candidate blobs in the first binary image based on at least one predetermined geometric parameter; and determining whether a first region in the color image, which first region corresponds to one of the first set of candidate blobs, represents a green traffic light by applying a green traffic light classifier on the first monochrome scale image.

According to one embodiment of the present disclosure, a method for detecting red traffic lights is provided. The method includes: obtaining a color image captured by a camera; converting the color image into a second binary image; identifying a second set of candidate blobs in the second binary image based on at least one predetermined geometric parameter; and determining whether a second region in the color image, which second region corresponds to one of the second set of candidate blobs, represents a red traffic light using a red traffic light classifier, where the color image is converted into the second binary image based on equation (1):

$$Q=2R-G-B \quad \text{Equation (1)}$$

where R, G, and B respectively represent red channel value, green channel value, and blue channel value of a pixel, and if the Q value of the pixel is greater than a second threshold value, the pixel will be set as valid, otherwise the pixel will be set as invalid. A valid pixel means that the pixel will be considered when identifying the candidate blobs.

In some embodiments, in the second binary image, a valid pixel may be in white, and an invalid pixel may be in black. In some embodiments, in the second binary image, a valid pixel may be in black, and an invalid pixel may be in white.

In some embodiments, the color image may be converted into a monochrome scale image based on red channel value, and the red traffic classifier may be suitable for monochrome image, and may be applied on the monochrome scale image to determine whether the second region in the color image represents a red traffic light. In some embodiments, the red traffic classifier may be suitable for color image, and may be applied on the color image to determine whether the second region in the color image is a red traffic light.

In some embodiments, the second threshold value may be in the range from about 210 to about 230. In some embodiments, the second threshold value may be 220. The second threshold value may be determined based on parameters of the camera such as color gamut and color saturation etc. As a result, pixels in which the red color prevails are set as valid.

In some embodiments, the at least one geometric parameter may include a size parameter. In some embodiments, the at least one geometric parameter may include a shape parameter.

In some embodiments, the size parameter may be a range of pixel number. In some embodiments, the range of pixel number may be from about 5 pixels to 300 pixels. In other words, blobs having more than about 300 pixels or less than about 5 pixels may be filtered out. The range of pixel number may be determined based on parameters of the camera such as resolution and focal length etc. As a result, too large or too small blobs, which are not likely to be a traffic light, may be filtered out. In addition, a traffic light being too close or too far from the camera may also be filtered out, since it may not be helpful to navigation accuracy.

In some embodiments, the size parameter may be a width range. In some embodiments, the width range may be from about 5 pixels to about 25 pixels. In other words, blobs having a minimum enclosing rectangle with a width greater than about 25 pixels or less than 5 pixels may be filtered out. The width range may also be determined based on parameters of the camera such as resolution and focal length. As a result, a traffic light being too close or too far from the camera may be filter out. In some embodiments, the at least one geometric parameter may include both the range of pixel number and the width range.

In some embodiments, the shape parameter may be a range of width to height ratio. In some embodiments, the range of width to height ratio may be from about 0.8 to about 1.25. In other words, blobs having a minimum enclosing rectangle with an aspect ratio greater than about 1.25 or less than about 0.8 may be filtered out. As a result, blobs which are not likely to be round may be filtered out.

In some embodiments, the red traffic light classifier may be template matching, neural network, support vector machine (SVM) or cascade detector.

According to one embodiment of the present disclosure, a system for detecting traffic lights is provided. The system includes a camera, and a processing device configured to: obtain a color image captured by the camera; convert the color image into a first monochrome scale image; convert the first monochrome scale image into a first binary image; identify a first set of candidate blobs in the first binary image based on at least one predetermined geometric parameter; and determine whether a first region in the color image, which first region corresponds to one of the first set of candidate blobs represents a green traffic light using a green traffic light classifier.

In some embodiments, the processing device may be further configured to: convert the color image into a second binary image; identify a second set of candidate blobs in the second binary image based on the at least one predetermined geometric parameter; and determine whether a second region in the color image, which second region corresponds to one of the second set of candidate blobs, represents a red traffic light using a red traffic light classifier, where the color image is converted into the second binary image based on equation (1):

$$Q=2R-G-B \qquad \text{Equation (1)}$$

where R, G, and B respectively represent red channel value, green channel value, and blue channel value of a pixel, and if the Q value of the pixel is greater than a second threshold value, the pixel will be set as valid, otherwise the pixel will be set as invalid. A valid pixel means that the pixel will be considered when identifying the candidate blobs.

According to one embodiment of the present disclosure, a system for detecting traffic lights is provided. The system may include: a camera; a first unit for converting a color image captured by the camera into a first monochrome scale image; a second unit for converting the first monochrome scale image into a first binary image; a third unit for identifying a first set of candidate blobs in the first binary image based on at least one predetermined geometric parameter; and a forth unit for determining whether a first region in the color image, which first region corresponds to one of the first set of candidate blobs, represents a green traffic light using a green traffic light classifier. In some embodiments, the system may further include: a fifth unit for converting the color image captured by the camera into a second binary image, where the third unit may identify a second set of candidate blobs in the second binary image based on the at least one predetermined geometric parameter and the forth unit may determine whether a second region in the color image, which second region corresponds to one of the second set of candidate blobs, represents a red traffic light using a red traffic light classifier, where the color image is converted into the second binary image based on equation (1):

$$Q=2R-G-B \qquad \text{Equation (1)}$$

where R, G, and B respectively represent red channel value, green channel value, and blue channel value of a pixel, and if the Q value of the pixel is greater than a second threshold value, the pixel will be set as valid, otherwise the pixel will be set as invalid.

By employing a method or a system of the present disclosure, the accuracy of traffic light detection may be improved.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
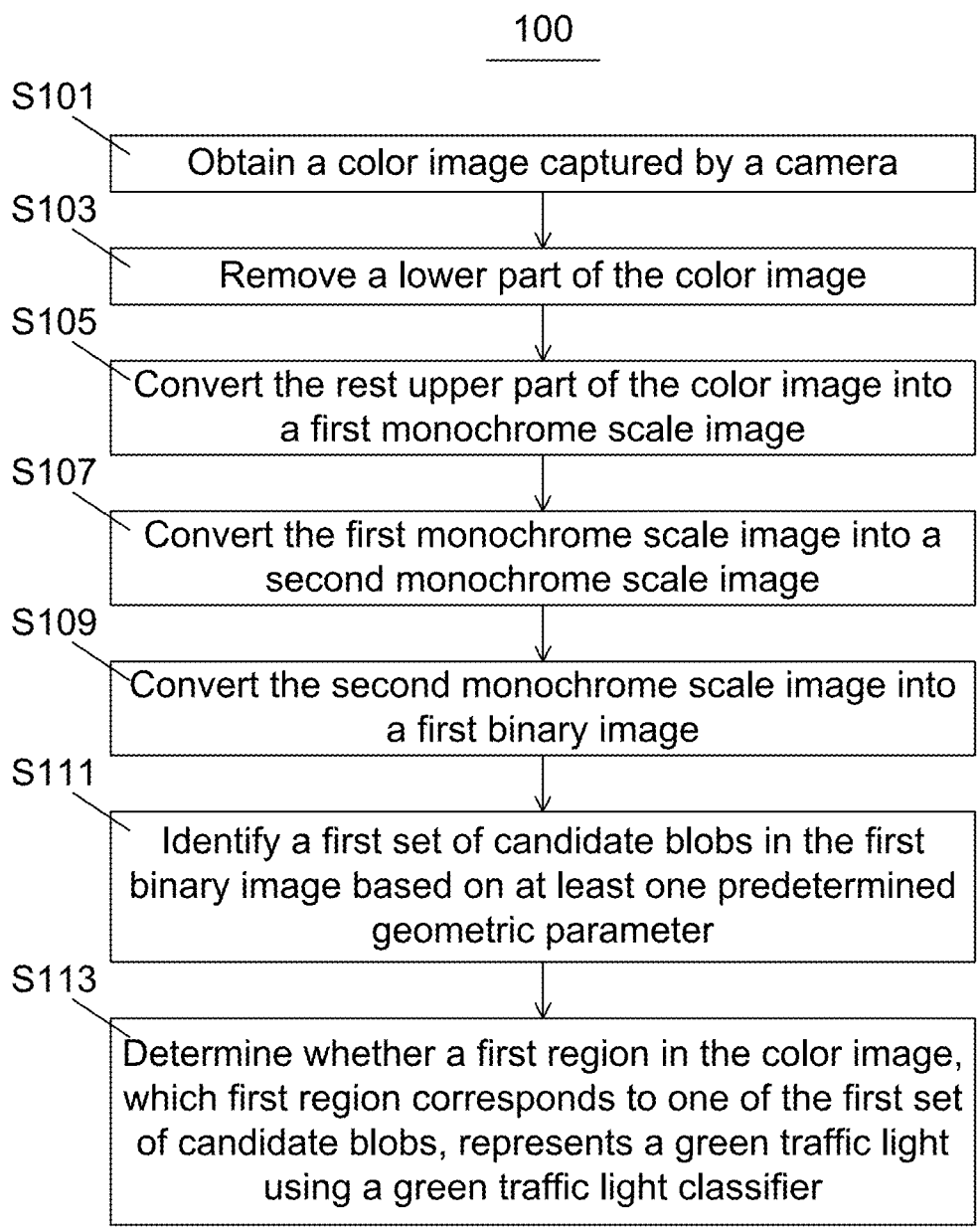
FIG. 1 illustrates a schematic flow chart of a method for detecting green traffic lights according to one embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

The inventors of the present application found that if a monochrome scale image is used in green traffic light detection, the accuracy may be improved.

FIG. 1 illustrates a schematic flow chart of a method 100 for detecting green traffic lights according to one embodiment of the present disclosure.

Referring to FIG. 1, in S101, obtain a color image captured by a camera. In some embodiments, the camera may be mounted on a vehicle.

Figure 2:
FIG. 2 schematically illustrates a color image captured by a camera mounted on a vehicle.

FIG. 2 illustrates an exemplary color image captured by a camera mounted on a vehicle. In some embodiments, a single eye camera may be used to capture color images. In some embodiments, color images may be captured at evenly spaced time points, and may be processed one by one successively.

Figure 3:
FIG. 3 schematically illustrates an upper part of the color image shown in FIG. 2.

In S103, remove a lower part of the color image. As a result, the rest upper part of the color image, as shown in FIG. 3, is remained for subsequent processing. The lower part of the image is removed because normally a traffic light may not appear in this part. By removing the upper part, the processing efficiency may be improved. However, removing the lower part of the color image is optional.

In S105, convert the rest upper part of the color image into a first monochrome scale image. In some embodiments, the first monochrome scale image may be a gray scale image.

Figure 4:
FIG. 4 schematically illustrates an example of a first monochrome scale image converted from the upper part of the color image shown in FIG. 3.

Different methodologies may be used to convert a color image into a monochrome scale image. In some embodiments, the upper part of the color image may be converted into the gray scale image based on brightness. The algorithm may be: Gray=0.299R+0.587G+0.114B, wherein R, G and B respectively stand for red, green and blue channel values of a pixel. In some embodiments, the upper part of the color image may be converted into the gray scale image based on green channel value, where Gray=G. FIG. 4 illustrates an example of the first monochrome scale image converted from the upper part of the color image shown in FIG. 3 based on green channel value.

In S107, convert the first monochrome scale image into a second monochrome scale image.

Figure 5:
FIG. 5 schematically illustrates an example of a second monochrome scale image converted from the first monochrome scale image shown in FIG. 4.

FIG. 5 illustrates an example of the second monochrome scale image converted from the first monochrome scale image shown in FIG. 4. In some embodiments, a white top-hat morphology operator may be applied on the first monochrome scale image to convert the first monochrome scale image into the second monochrome scale image, to enhance the contrast, so as to prevent missing any positive. As a result, relatively light regions will be lighter and relatively dark regions will be darker. Besides, large light regions, for example, regions corresponding to the sky, may be converted into dark regions due to the white top-hat morphology operator. In some embodiments, dilate and/or erode may be applied when converting the first monochrome scale image into the second monochrome scale image, to reduce the disturbance of isolated noise points.

However, converting the first monochrome scale image into the second monochrome scale image is also optional.

In S109, convert the second monochrome scale image into a first binary image.

Figure 6:
FIG. 6 schematically illustrates an example of a first binary image converted from the second monochrome scale image shown in FIG. 5.

FIG. 6 illustrates an example of the first binary image converted from the second monochrome scale image shown in FIG. 5. By converting the second monochrome scale image into the first binary image, pixels may be categorized into two classes, one is "valid" (i.e., white blobs in FIG. 6) and another is "invalid" (i.e., black portion in FIG. 6). Valid pixels will be considered in subsequent processes for blob analyzing. The white blobs in FIG. 6 are possible regions corresponding to green traffic lights. In some embodiments, valid pixels may be converted into black and invalid pixels may be converted into white.

In some embodiments, the second monochrome scale image may be converted into the first binary image using an OSTU method.

In some embodiments, the second monochrome scale image may be converted into the first binary image based on a first threshold of brightness. In some embodiments, the first threshold of brightness may be in a range from about 70% to about 80% of a mean brightness of the second monochrome scale image. In some embodiments, the first threshold of brightness may be 75% of the mean brightness. The first threshold of brightness may be determined based on parameters of the camera such as photosensitivity, etc.

It should be noted that, in some embodiments, the first binary image may be converted from the first monochrome scale image directly.

In S111, identify a first set of candidate blobs in the first binary image based on at least one predetermined geometric parameter.

Figure 7:
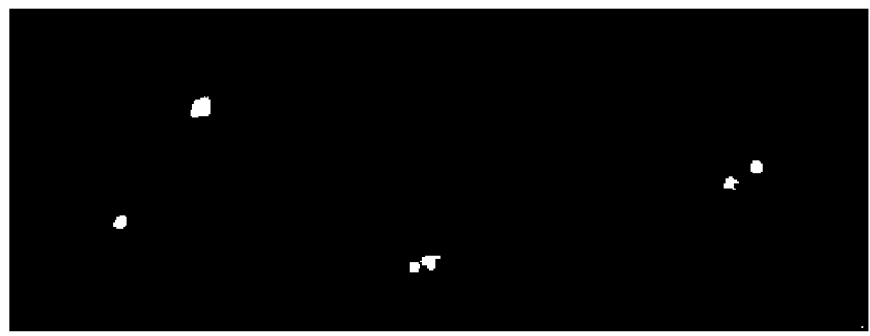
FIG. 7 schematically illustrates a first set of candidate blobs identified in FIG. 6.

FIG. 7 illustrates the first set of candidate blobs identified in FIG. 6. To reduce computation load, some blobs may be filtered out because they are not likely to be traffic lights based on their sizes and/or shapes.

In some embodiments, the at least one geometric parameter may include a size parameter.

In some embodiments, the size parameter may be a range of pixel number. In some embodiments, the range of pixel number may be from about 5 pixels to 300 pixels. In other words, blobs having more than about 300 pixels or less than about 5 pixels may be filtered out. The range of pixel number may be determined based on parameters of the camera such as resolution and focal length etc. As a result, too large or too small blobs, which are not likely to be a traffic light, may be filtered out. In addition, a traffic light being too close or too far from the camera may also be filtered out, since it may not be helpful to navigation accuracy.

In some embodiments, the size parameter may be a width range. In some embodiments, the width range may be from about 5 pixels to about 25 pixels. In other words, blobs having a minimum enclosing rectangle with a width greater than about 25 pixels or less than 5 pixels may be filtered out. The width range may also be determined based on parameters of the camera such as resolution and focal length. As a result, a traffic light being too close or too far from the camera may be filter out. In some embodiments, the at least one geometric parameter may include both the range of pixel number and the width range.

In some embodiments, the at least one geometric parameter may include a shape parameter.

In some embodiments, the shape parameter may be a range of width to height ratio. In some embodiments, the range of width to height ratio may be from about 0.8 to about 1.25. In other words, blobs having a minimum enclosing rectangle with an width to height ratio greater than about 1.25 or less than about 0.8 may be filtered out. As a result, blobs which are not likely to be round may be filtered out.

In S113, determine whether a first region in the color image, which first region corresponds to one of the first set of candidate blobs, represents a green traffic light using a green traffic light classifier.

In some embodiments, the green traffic light classifier may be suitable for color image, and may be applied on the first region in the color image directly to determine whether it represents a green traffic light.

In some embodiments, the green traffic light classifier may be suitable for monochrome scale images, and may be applied on a region in the first monochrome scale image, which region corresponds to one of the first set of candidate blobs (i.e., corresponding to the first region in the color image), to determine whether the first region represents a green traffic light. When a green traffic light classifier suitable for monochrome scale images is used, whether a region represents a green traffic light or not may be determined based on brightness of a monochrome scale image, thus the influence of ambient lights on the color of a green traffic light in a color image may be reduced.

Figure 8:
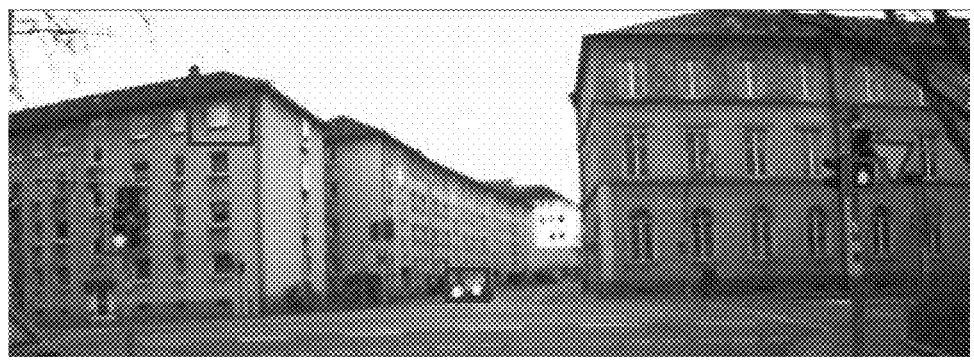
FIG. 8 schematically illustrates regions corresponding to the first set of candidate blobs being windowed in the first monochrome scale image.

FIG. 8 illustrates the regions, which are windowed, in the first monochrome scale image corresponding to the first set of candidate blobs. Some regions are false candidates, for example, vehicle headlights, windows, traffic signs, and the like. By applying the green traffic light classifier, those false candidates may be filtered out, and a region corresponding to a green traffic light may be identified.

In some embodiments, the green traffic light classifier may be applied on a region in the second monochrome scale image, which region corresponds to one of the first set of candidate blobs, to determine whether it represents a green traffic light.

In some embodiments, the green traffic light classifier may be template matching, neural network, support vector machine (SVM) or cascade detector. In some embodiments, the green traffic light classifier are preferably SVM or cascade detector.

Figure 9:
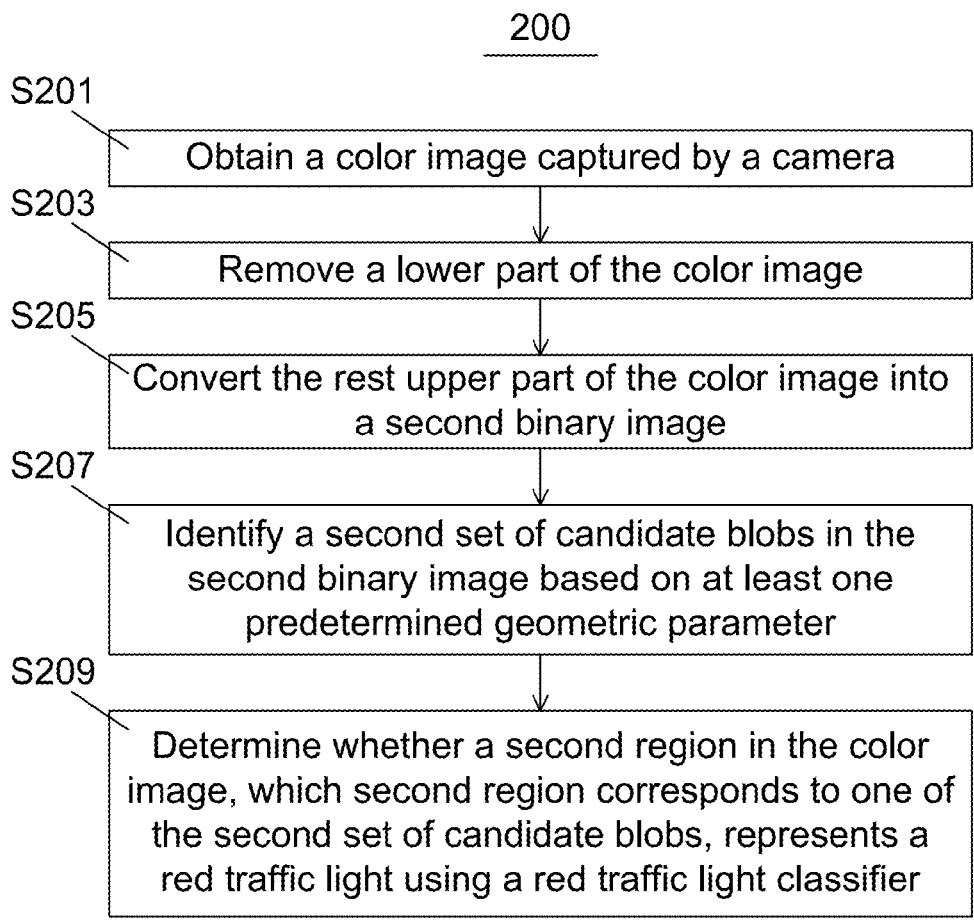
FIG. 9 illustrates a schematic flow chart of a method for detecting red traffic lights according to one embodiment of the present disclosure.

FIG. 9 illustrates a schematic flow chart of a method 200 for detecting red traffic lights according to one embodiment of the present disclosure.

Referring to FIG. 9, in S201, obtain a color image captured by a camera.

Figure 10:
FIG. 10 schematically illustrates a color image captured by a camera mounted on a vehicle.

FIG. 10 illustrates an exemplary color image captured by a camera.

Figure 11:
FIG. 11 schematically illustrates an upper part of the color image shown in FIG. 10.

In S203, remove a lower part of the color image. FIG. 11 illustrates the rest upper part of the color image.

The process of S201 and S203 may be similar with that of S101 and S103, respectively. Therefore, S201 and S203 will not be described in detail here.

In S205, convert the rest upper part of the color image into a second binary image.

Figure 12:
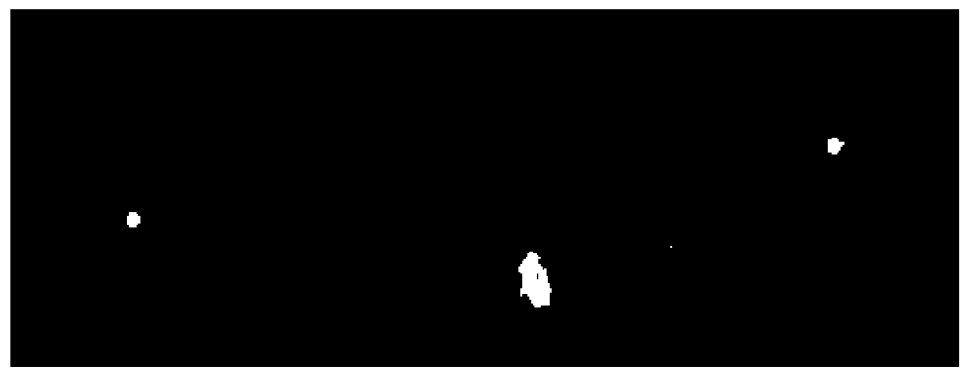
FIG. 12 schematically illustrates an example of a second binary image converted from the upper part of the color image shown in FIG. 11.

FIG. 12 illustrates the second binary image converted from FIG. 11. In some embodiments, the upper part of the color image may be converted into the second binary image based on equation (1):

$$Q=2R-G-B \qquad \text{Equation (1)}$$

Where R, G and B respectively represent red channel value, green channel value and blue channel value of a pixel, and if the Q value of the pixel is greater than a second threshold value, the pixel will be set as valid, otherwise the pixel will be set as invalid. A valid pixel means that the pixel will be considered when identifying candidate blobs.

Obtaining RGB information of pixels in a color image is well known in the art, and it will not be described in detail here. Inventors of the present disclosure found that a region in the color image corresponding to a red traffic light may have different R value under different environments. Therefore, in conventional methods which use only R value to determine whether a region represents a red traffic light, a region representing a red traffic light may be determined to be negative, as the R value may be out of a predetermined range. However, the Q value is more stable, because the influences caused by the environments on the RGB values may be offset to certain extent. Compared with conventional techniques, false negative rate may be reduced.

In some embodiments, the second threshold value may be in the range from about 210 to about 230. In some embodiments, the second threshold value may be 220. The second threshold value may be determined based on parameters of the camera such as color gamut and color saturation etc. As a result, pixels whose red color prevails will be set as valid. In FIG. 12, valid pixels are converted into white and invalid pixels are converted into black. In some embodiments, valid pixels may be converted into black and invalid pixels may be converted into white.

In S207, identify a second set of candidate blobs in the second binary image based on at least one predetermined geometric parameter.

Figure 13:
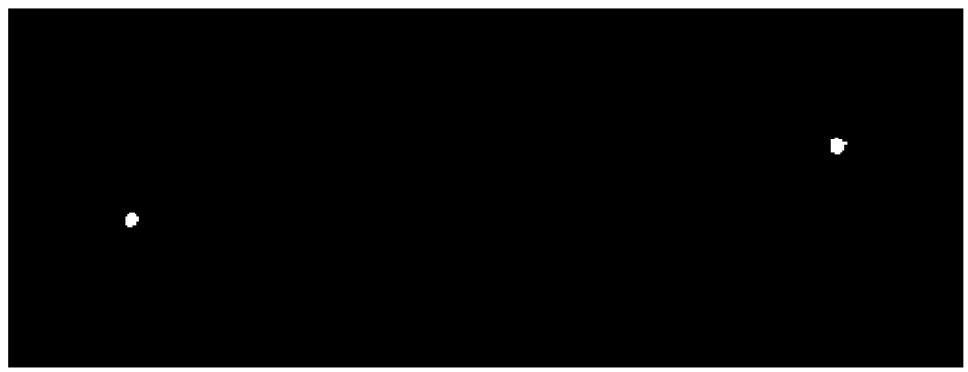
FIG. 13 schematically illustrates a second set of candidate blobs identified in FIG. 12.

FIG. 13 illustrates the second set of candidate blobs identified from the second binary image.

As the geometric parameters for red traffic light detection may be same as those for green traffic light detection, and the process of S207 may be similar with that of S111, S207 will not be described in detail here.

In S209, determine whether a second region in the color image, which second region corresponds to one of the second set of candidate blobs, represents a red traffic light using a red traffic light classifier.

In some embodiments, the red traffic classifier may be applied on the second region in the color image to determine whether the second region represents a red traffic light.

Figure 14:
FIG. 14 schematically illustrated regions corresponding to the second set of candidate blobs being windowed in a monochrome scale image.

In some embodiments, the color image may be converted into a monochrome scale image, and the red traffic classifier may be applied on a region in the monochrome scale image, which region corresponds to the second region in the color image, to determine whether the second region in the color image represents a red traffic light. FIG. 14 illustrates the monochrome scale image converted from the color image, with the regions corresponding to the second set of candidate blobs being windowed.

In some embodiments, the monochrome scale image may be a grey scale image converted from the color image based on brightness. In some embodiments, the monochrome scale image may be converted from the color image by removing green and blue channel information.

In some embodiments, the red traffic light classifier may be template matching, neural network, SVM or cascade detector. In some embodiments, the red traffic light classifier is preferably SVM or cascade detector.

In some embodiments, the method for detecting green traffic lights and the method for detecting red traffic lights may be performed in serial or in parallel, based on a same color image.

According to one embodiment of the present disclosure, a method for detecting traffic lights is provided. The method includes both green traffic light detection and red traffic light detection, and the method may include S101 to S113 and S201 to S209. In some embodiments, in S209, the red traffic light may be applied on the first monochrome image obtained in S105, to determine whether the second region represents a red traffic light.

According to one embodiment of the present disclosure, a system for detecting traffic lights is provided. The system includes a processing device configured to perform S101 to S113 which are described in embodiments above. In some embodiments, the processing device may be further configured to perform S201 to S209.

According to one embodiment of the present disclosure, a system for detecting traffic lights is provided. The system may include: a camera; a first unit for converting a color image captured by the camera into a first monochrome scale image; a second unit for converting the first monochrome scale image into a first binary image; a third unit for identifying a first set of candidate blobs in the first binary image based on at least one predetermined geometric parameter; and a fourth unit for determining whether a first region in the color image, which first region corresponds to one of the first set of candidate blobs, represents a green traffic light using a green traffic light classifier. In some embodiments, the system may further include: a fifth unit for converting the color image captured by the camera into a second binary image, where the third unit is able to identify a second set of candidate blobs in the second binary image based on the at least one predetermined geometric parameter, and the forth unit is able to determine whether a second region in the color image, which region corresponds to one of the second set of candidate blobs, represents a red traffic light using a red traffic light classifier, where the color image is converted into the second binary image based on equation (1):

$$Q=2R-G-B \qquad \text{Equation (1)}$$

where R, G, and B respectively represent red channel value, green channel value, and blue channel value of a pixel, and if the Q value of the pixel is greater than a second threshold value, the pixel will be set as valid, otherwise the pixel will be set as invalid.

By employing a method or a system of the present disclosure, the accuracy and efficiency of traffic light detection may be improved.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for detecting traffic lights, comprising:
obtaining a color image captured by a camera;
converting the color image into a first monochrome scale image
converting the first monochrome scale image into a first binary image wherein the color image is converted into the first monochrome scale image based on a first threshold of brightness;
identifying a first set of candidate blobs in the first binary image based on at least three predetermined geometric parameters, wherein the at least three predetermined geometric parameters comprise a range of pixel number, a width range, and a range of width to height ratio;
determining whether a first region in the color image, which corresponds to one of the first set of candidate blobs, represents a green traffic light using a green traffic light classifier;
converting the color image into a second binary image, wherein the color image is converted into the second binary image based on a second threshold, the second threshold being determined based on camera parameters including at least one of a color gamut and a color saturation;
identifying a second set of candidate blobs in the second binary image; and
determining whether a second region in the color image, which corresponds to one of the second set of candidate blobs, represents a red traffic light using a red traffic light classifier.

2. The method according to claim 1, wherein the first monochrome scale image is a gray scale image, and wherein the range of pixel number and the width range are based on a resolution and a focal length of the camera.

3. The method according to claim 2, wherein the color image is converted into the gray scale image based on green channel value, wherein the range of pixel number is between 5 and 300 pixels, and wherein the width range is between 5 and 25 pixels.

4. The method according to claim 1 further comprising applying a white top-hat morphology operator on the first monochrome scale image to obtain a second monochrome scale image, and converting the second monochrome scale image into the first binary image, and wherein the range of width to height ratio is between 0.8 and 1.25.

5. The method according to claim 4, wherein the green traffic light classifier is based on one of support vector machine or cascade detection.

6. The method according to claim 5, wherein the first threshold of brightness is from about 70% to about 80% of a mean brightness of the second monochrome scale image.

7. The method according to claim 1, wherein the green traffic light classifier is suitable for monochrome scale images, and it is applied on the first monochrome scale image to determine whether the first region represents a green traffic light.

8. The method according to claim 1, where the color image is converted into the second binary image based on equation (1):

$$Q=2R-G-B \qquad \text{Equation (1)}$$

where R, G, and B respectively represent red channel value, green channel value, and blue channel value of a pixel, if the Q value of the pixel is greater than a second threshold value, the pixel will be set as valid, otherwise the pixel will be set as invalid.

9. The method according to claim 8, wherein the red traffic light classifier is suitable for monochrome scale images, and it is applied on the first monochrome scale image to determine whether the second region represents a red traffic light.

10. The method according to claim 8, wherein the second threshold value is from about 210 to about 230.

11. The method of claim 1, further comprising removing a lower portion of the color image prior to converting the color image into the first monochrome scale image.

12. A system for detecting traffic lights, comprising:
a processing device, configured to:
obtain a color image captured by a camera;
convert the color image into a first monochrome scale image, wherein the color image is converted into the first monochrome scale image based on a first threshold of brightness;
convert the first monochrome scale image into a first binary image;
identify a first set of candidate blobs in the first binary image based on at least three predetermined geometric parameters, wherein the at least three predetermined geometric parameters comprises a range of pixel number, a width range, and a range of width to height ratio;
determine whether a first region in the color image, which corresponds to one of the first set of candidate blobs, represents a green traffic light using a green traffic light classifier;
convert the color image into a second binary image, wherein the color image is converted into the second binary image based on a second, different threshold, the second threshold being determined based on camera parameters including at least one of a color gamut and a color saturation;
identify a second set of candidate blobs in the second binary image; and
determine whether a second region in the color image, which corresponds to one of the second set of candidate blobs, represents a red traffic light using a red traffic light classifier.

13. The system according to claim 12, wherein the first monochrome scale image is a gray scale image, and wherein the range of pixel number is 5 to 300 pixels.

14. The system according to claim 13, wherein the color image is converted into the gray scale image based on green channel value, and wherein the width range is 5 to 25 pixels.

15. The system according to claim 12, wherein the processing device is further configured to apply a white top-hat morphology operator on the first monochrome scale image to obtain a second monochrome scale image, and convert the second monochrome scale image into the first binary image, and wherein the range of width to height ratio is between 0.8 and 1.25.

16. The system according to claim 15, wherein the range of pixel number and the width range are based on one or more properties of the camera.

17. The system according to claim 16, wherein the first threshold of brightness is from about 70% to about 80% of a mean brightness of the second monochrome scale image, and wherein the green traffic light classifier comprises template matching, a neural network, a support vector machine, or a cascade detector.

18. The system according to claim 12, wherein the color image is converted into the second binary image based on equation (1):

$$Q = 2R - G - B \qquad \text{Equation (1)}$$

where R, G, and B respectively represent red channel value, green channel value, and blue channel value of a pixel, if the Q value of the pixel is greater than a second threshold value, the pixel will be set as valid, otherwise the pixel will be set as invalid.

19. The system according to claim 18, wherein the second threshold value is from about 210 to about 230.

20. The system according to claim 18, wherein the red traffic light classifier is suitable for monochrome scale images, and is applied on the first monochrome scale image to determine whether the second region represents a red traffic light.

21. The system of claim 12, wherein the processing device is further configured to remove a lower portion of the color image prior to converting the color image into the first monochrome scale image.

* * * * *